(12) United States Patent
Chen et al.

(10) Patent No.: US 11,686,658 B2
(45) Date of Patent: Jun. 27, 2023

(54) FRICTION AND WEAR TEST DEVICE WITH PIN-ON-PLATE DIFFERENTIAL TEMPERATURE DISTRIBUTION AND SELF-ADAPTIVE ADJUSTMENT

(71) Applicant: JIANGSU UNIVERSITY, Zhenjiang (CN)

(72) Inventors: Wei Chen, Zhenjiang (CN); Peng Cao, Zhenjiang (CN); Yishu Cao, Zhenjiang (CN); Ying Bai, Zhenjiang (CN); Wei Zhang, Zhenjiang (CN); Zeming Wang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/621,750

(22) PCT Filed: Jul. 7, 2021

(86) PCT No.: PCT/CN2021/104865
§ 371 (c)(1),
(2) Date: Dec. 22, 2021

(87) PCT Pub. No.: WO2022/042057
PCT Pub. Date: Mar. 3, 2022

(65) Prior Publication Data
US 2022/0349794 A1 Nov. 3, 2022

(30) Foreign Application Priority Data

Aug. 26, 2020 (CN) .......................... 202010870715.8

(51) Int. Cl.
*G01N 3/56* (2006.01)

(52) U.S. Cl.
CPC ....... *G01N 3/56* (2013.01); *G01N 2203/0226* (2013.01); *G01N 2203/0228* (2013.01)

(58) Field of Classification Search
CPC .......... G01N 19/02; G01N 2203/0226; G01N 2203/0228; G01N 2203/0694; G01N 3/56
(Continued)

(56) References Cited

FOREIGN PATENT DOCUMENTS

| CN | 102156080 A | 8/2011 |
|---|---|---|
| CN | 205506600 U * | 8/2016 |

(Continued)

*Primary Examiner* — Daniel S Larkin
*Assistant Examiner* — Nashmiya S Fayyaz
(74) *Attorney, Agent, or Firm* — Bayramoglu Law Offices LLC (57) ABSTRACT

A pin-on-plate friction and wear test device includes a high temperature heating chamber and a cooling pin. The high temperature heating chamber is fastened horizontally to the mobile base. The axis of the cooling pin is perpendicular to the upper surface of the mobile base. The electric resistance heating plate is located in the bottom closed space under the friction sample plate in the high temperature heating chamber. The electric resistance heats the fixed sample to experiment temperature. The inner layout of pin is a circling cooling channel where the cooling medium adjusts and cools the temperature of the sample. Thermocouples are separately distributed in the temperature measuring groove of the high temperature heating chamber and the temperature measuring hole of the cooling pin for real-time temperature measurement. The device can simulate the friction and wear properties of the high-strength steel plate and hot-stamping die in the differential temperature environment.

5 Claims, 6 Drawing Sheets

(58) Field of Classification Search
USPC .................................................. 73/9, 118.01
See application file for complete search history.

(56) References Cited

FOREIGN PATENT DOCUMENTS

| CN | 108318364 | A | | 7/2018 | |
|----|-----------|---|---|--------|---|
| CN | 108318365 | A | * | 7/2018 | .............. G01N 3/02 |
| CN | 108548742 | A | | 9/2018 | |
| CN | 208520705 | U | * | 2/2019 | .............. G01N 3/56 |
| CN | 110160865 | A | | 8/2019 | |
| CN | 112345394 | A | | 2/2021 | |
| KR | 20080057363 | A | * | 6/2008 | |
| KR | 20090067865 | A | | 6/2009 | |

* cited by examiner

FRICTION AND WEAR TEST DEVICE WITH PIN-ON-PLATE DIFFERENTIAL TEMPERATURE DISTRIBUTION AND SELF-ADAPTIVE ADJUSTMENT

CROSS REFERENCE TO THE RELATED APPLICATIONS

This application is the national phase entry of International Application No. PCT/CN2021/104865, filed on Jul. 7, 2021, which is based upon and claims priority to Chinese Patent Application No. 202010870715.8, filed on Aug. 26, 2020, the entire contents of which are incorporated herein by reference.

TECHNICAL FIELD

The present invention discloses a friction and wear test device that can reach a differential temperature distribution in which the pin and plate have different temperatures and can self-adjust the temperatures.

BACKGROUND

Prior technology about friction and wear test device cannot simulate the differential temperature distribution where the friction sample plate can be heated to a high temperature, but the temperature of the friction pin is much lower than the plate's temperature. The design can simulate the friction and wear properties of two kinds of material during the mutual friction process in a differential temperature environment. A sheet metal will be instantly translated to the die when it is heated to austenitization in the heating furnace. The characteristic of hot-stamping is that the sheet metal is formed in the die and cooled concurrently by circulating cooling medium. The initial temperature of the sheet metal forming is 600-850° C., but the temperature of the dieface is 100-300° C. Therefore, the important problem is the self-adaptive adjustment of pin's and plate's temperatures. The present invention has the high heating efficiency by heat conduction instead of radiant heating method used by previous devices. Furthermore, the invention has the other advantages that the friction pin is easy to be manufactured and has high cooling efficiency compared with the existing technology.

SUMMARY

The present invention is intended to provide a pin-on-plate friction and wear test device that can simulate the tribological behavior in a differential temperature environment. The self-adaptive adjustment of the temperature can be obtained by thermocouple measurement. The device can imitate the friction and wear environment which is similar to the actual working condition of hot-stamping, and the pin and plate have good processability.

According to the present invention, a friction and wear test device is provided, capable of achieving differential temperature of the pin and plate with self-adaptive adjustment. The device is characterized by its high temperature heating chamber and cooling pin.

The high temperature heating chamber is fastened horizontally to the mobile base. The axis of the cooling pin is perpendicular to the upper surface of the mobile base. The electric resistance heating plate is located in the bottom closed space under the friction sample plate in the high temperature heating chamber. The electric resistance heats the fixed sample to experiment temperature. The inner layout of pin is a circling cooling channel where the cooling medium adjusts and cools the temperature of the sample. Thermocouples are separately distributed in the temperature measuring groove of the heating chamber and the temperature measuring hole of the cooling pin for real-time temperature measurement.

The high temperature heating chamber consists of insulation cover, friction sample plate, briquetting, support block, ceramic plate, electric resistance heating plate, thermal insulation fiber, support shell, thermal insulation shell, thermal insulation base, cushion block, temperature measuring groove, base, and mobile base. Among them, electric resistance wires are disposed on the electric resistance heating plate. The friction sample plate is fixed in the square groove of the support block by briquetting, which is attached to the support block by screws. The support block is connected to the support shell by screws. The lower surface of the support block is in contact with the upper surface of the ceramic plate, which is located on the upper surface of the electric resistance heating plate. The outer wall of the ceramic plate is in contact with the inner wall of the support shell. The bottom of thermal insulation shell is connected to the side wall of thermal insulation base by screws. The support shell is screwed to the thermal insulation base. The thermal insulation shell and the support shell are connected by bolts. The cushion block is arranged in the square groove of the thermal insulation base. The thermal insulation base is screwed to the base, which is connected to the mobile base by screws. The electric resistance heating plate is installed on the stepped surface of the thermal insulation base and the upper plane of the cushion block. The ceramic plate and the support block are provided with through-holes in the area below the friction sample plate. The electric resistance heating plate heats the friction sample plate by the through-hole heat radiation and heat conduction in the ceramic plate and the support block. Due to the narrow space, this heating mode improves heating efficiency and has low energy consumption.

The cooling pin of the present invention comprises of upper sample fixture, upper sample, copper tube, water inlet, water outlet and temperature measuring hole. The upper sample is provided with a temperature measuring hole whose length is 10-12 mm and the diameter is 2 mm for the thermocouple. The angle between the axis of the temperature measuring hole and the bottom surface of the upper sample is 60-70°. The vertical distance from the center of the hole's bottom surface to the bottom surface of the upper sample is 3-4 mm. A stepped hole is inside the upper sample fixture. The diameters of a stepped hole increase gradually from top to bottom, which are called the small hole, the middle hole, or the threaded hole. The distance between the bottom surface of the small hole and the upper surface of the upper sample fixture is 20-30 mm. The length of the threaded hole is 20-25 mm. The distance between the bottom surface of the middle hole and the bottom surface of the threaded hole is 30-40 mm. A straight hole is arranged in the upper sample. The bottom surface of the straight hole is 5-8 mm far from the bottom surface of the upper sample. The upper sample is connected to the stepped hole of the upper sample fixture by a thread whose length is 15-20 mm. The waterproof tape can be used to prevent water leakage. The joint between the upper sample fixture and the upper sample step hole is used for tightening and limiting. The copper tube and the small hole of the upper sample fixture are connected by an interference joint. The copper tube should be fixed by spot welding, if necessary. The water inlet is connected to the small hole and is arranged on the outer wall of the upper sample fixture at a distance of 8-15 mm from the bottom of the small hole. The water outlet is connected to the middle hole and is arranged on the outer wall of the upper sample fixture at the bottom of the middle hole. There is a 2-3 mm radial gap between the inner wall of the straight hole and the outer wall of the copper tube in the upper sample. The gap between the bottom surface of the copper tube and the bottom of the straight hole is 4-5 mm. The interior of the copper tube is the inlet channel. The outlet channel consists of the bottom gap, the radial gap, the middle hole and the threaded hole of the upper sample fixture. The water inlet, water inlet channel, water outlet channel, water outlet, and external cooling equipment form a circulating cooling system for cooling the bottom of the upper sample.

Furthermore, the friction sample plate of the present invention is a rectangular panel. The surface of the sample is perpendicular to the axis of the cooling pin. Four sides of the friction sample plate under the normal force of the briquetting can prevent warping and reduce experimental error caused by the deformation of the friction sample plate during the test.

The internal temperature of the high temperature heating chamber can reach 900° C. The temperature of the friction sample plate can reach 850° C. The temperature measuring groove for the thermocouples is arranged on the lower surface of the support block. The length of the groove is 60-70 mm and the width and height are both 2 mm. In addition to that, the space between the support shell and the thermal insulation shell and the gap of the thermal insulation base are filled with thermal insulation fiber. The electric resistance wire is laid out horizontally, ensuring rapid heating of the friction sample plate. The support shell, thermal insulation shell, thermal insulation base, and cushion block are made of thermal insulation and high temperature resistant metal, which can prevent the loss of the internal heat. The support block is made of heat conductive and high temperature resistant metal. The ceramic plate is made of insulating and high temperature resistant ceramic material, which can ensure the safe operation of electric resistance wire and circuit to prevent electric shock.

The circulating cooling system decreases the effect of the high temperature heating chamber on the upper sample and can maintain the temperature of the upper sample at 100-300° C. The cooling path of the circulating cooling system is as follows: 1) The circulating cooling medium adjusts the initial temperature via the external cooling equipment; 2) The circulating cooling medium enters the internal channel of the upper sample fixture via the water inlet; 3) The circulating cooling medium arrives at the bottom gap of the upper sample via the water inlet channel; 4) The circulating cooling medium reaches the water outlet via the upper sample's radial gap and the water outflow channel in the stepped hole of the upper sample fixture, and returns to the external cooling equipment.

The benefits of the present invention are as follow:

1. The present invention can simulate the friction and wear behavior of the pin and plate in a differential temperature environment. The internal temperature of the high temperature heating chamber can reach 900° C. The closed chamber can ensure uniform and stable heating. The briquetting on the friction sample plate can prevent the warpage of the fiction sample plate during the test.

2. In particular, the design can simulate the actual working condition of hot-stamping. Under the closed heating environment of the high temperature heating chamber, the friction sample plate can be heated rapidly to the austenitizing temperature, ranging from 650-850° C. The temperature of the upper sample is reduced by the circulating cooling medium and is stable at 100-300° C. During the test, the temperature and velocity of the cooling medium can be adjusted to control the temperature of the upper sample. Through the real-time monitoring of the thermocouple, the device can achieve the self-adaptive adjustment of the pin and plate temperature.

3. The upper sample fixture and upper sample are connected by a threaded linkage, which can prevent the upper sample from loosening during the test. The cooling medium enters the bottom of the upper sample through a copper tube and is discharged through the radial gap between the straight hole of the upper sample and the copper tube. The structure of the circulating cooling system has good cooling efficiency and makes full use of the internal space of the cooling pin.

4. The main heating method of the friction sample plate is heat conduction, accompanied by thermal radiation, and it has a high heating efficiency.

Names of reference numerals in the drawings: 1.insulation cover, 2.friction sample plate, 3.briquetting, 4.support block, 5.ceramic plate, 6.electric resistance heating plate, 7.thermal insulation fiber, 8.thermal insulation shell, 9.thermal insulation base, 10.base, 11.mobile base, 12.cushion block, 13.temperature measuring groove, 14.stepped surface, 15.support shell, 16.bolt, 17.upper sample fixture, 18.upper sample, 19. copper tube, 20.water inlet, 21. water outlet, 22.temperature measuring hole, 23.small hole, 24.middle hole, 25.threaded hole, 26.connecting head, 27.radial gap, 28.bottom gap, 29. straight hole.

DETAILED DESCRIPTION OF THE EMBODIMENTS

The present invention will be explained in details in combination with the following figures and specific embodiments.

Figure 1:
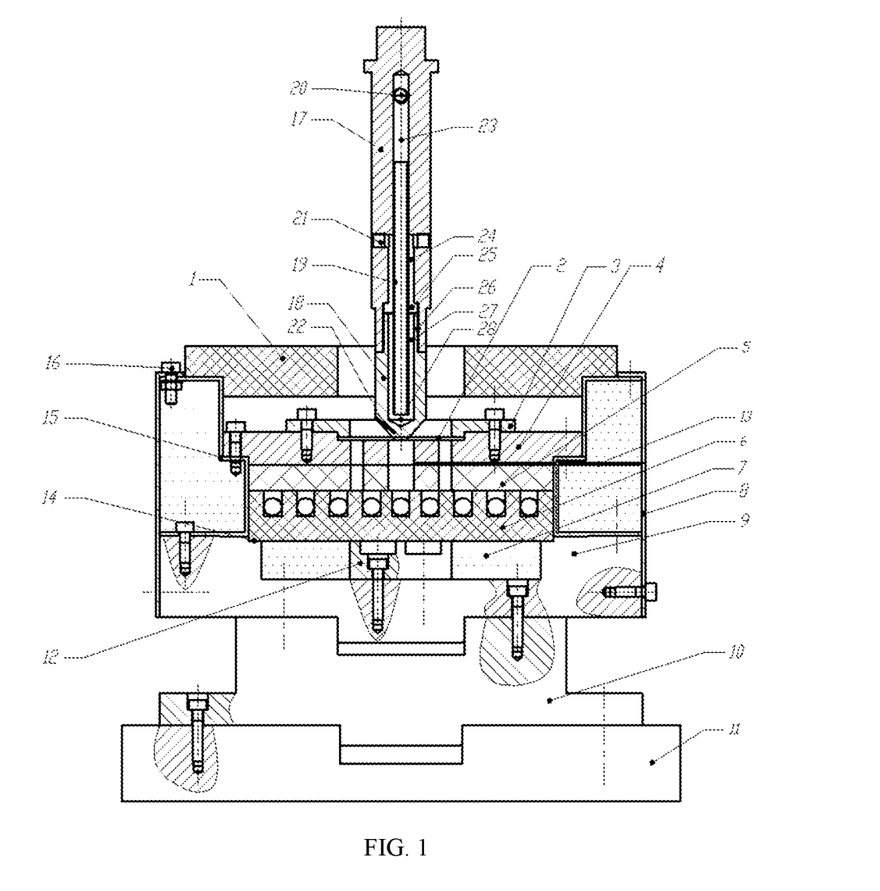
FIG. 1 is the friction and wear test device of the present invention.

Referring to FIG. 1, the friction and wear test device realizes the pin-on-plate differential temperature distribution and self-adaptive adjustment, which includes the high temperature heating chamber and the cooling pin. The high temperature heating chamber is fixed horizontally on the mobile base 11, and the axis of the cooling pin is perpendicular to the surface of the mobile base 11. The bottom space under the friction sample plate 2 is enclosed and the electric resistance heating plate 6 is arranged. The friction sample plate 2 can be heated to the test temperature with electric resistance heating. There are circulating cooling channel in the cooling pin. The circulating cooling medium can adjust the temperature of the upper sample 18 with the circulating cooling channel. The thermocouple arranged in the temperature measuring groove 13 of the high temperature heating chamber and the temperature measuring hole 22 of the cooling pin can monitor the real-time temperature of the friction sample plate 2 and the upper sample 18 respectively, ensuring that the pin and plate are in different temperature fields. The heating of the electric resistance heating plate and the flow rate and temperature of cooling water can be controlled through an external control circuit.

Figure 2:
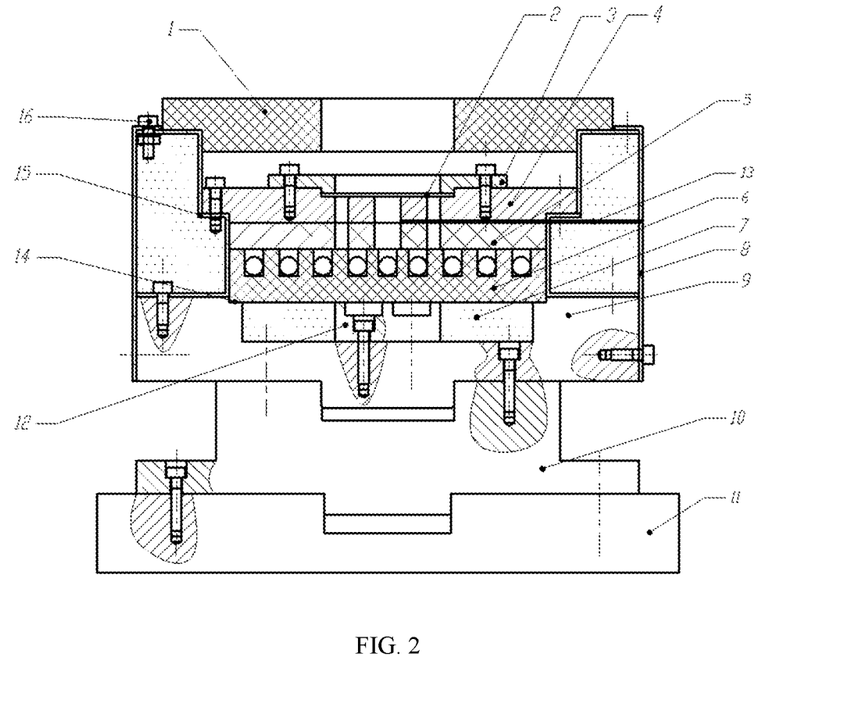
FIG. 2 is the view of the high temperature heating chamber.

As shown in FIG. 2, the high temperature heating chamber consists of the insulation cover 1, friction sample plate 2, briquetting 3, support block 4, ceramic plate 5, electric resistance heating plate 6, thermal insulation fiber 7, thermal insulation shell 8, support shell 15, thermal insulation base 9, cushion block 12, temperature measuring groove 13, base 10 and mobile base 11. The electric resistance wires are disposed on the electric resistance heating plate 6. The friction sample plate 2 is fixed to the square groove of the support block 4 through the briquetting 3. The briquetting 3 is connected to the support block 4 by screws, and the support block 4 is connected to the support shell 15 by screws. The lower surface of the support block 4 is in contact with the upper surface of the ceramic plate 5. The outer wall of the ceramic plate 5 is in contact with the inner wall of the support shell 15. The bottom of thermal insulation shell 8 is connected to the side wall of thermal insulation base 9 by screws. The support shell 15 is connected to the thermal insulation base 9 by bolts. The cushion block 12 is arranged in the square groove of the thermal insulation base 9 by screws. The bottom of the thermal insulation shell 8 is connected to the side wall of the thermal insulation base 9 by screws. The thermal insulation shell 8 is connected to the support shell 15 by bolts 16. The thermal insulation base 9 is connected to the base 10 by screws, and the base 10 is connected to the mobile base 11 by screws. The electric resistance heating plate 6 is arranged on the stepped surface 14 of the thermal insulation base 9 and the upper surface of the cushion block 12. The ceramic plate 5 and the support block 4 have through-holes in the area directly under the friction sample plate 2. The electric resistance heating plate 6 heats the friction sample plate 2 through the through-hole heat radiation and the heat conduction in the ceramic plate 5 and the support block 4. Due to the narrow space, this heating mode improves heating efficiency and has low energy consumption.

Figure 5:
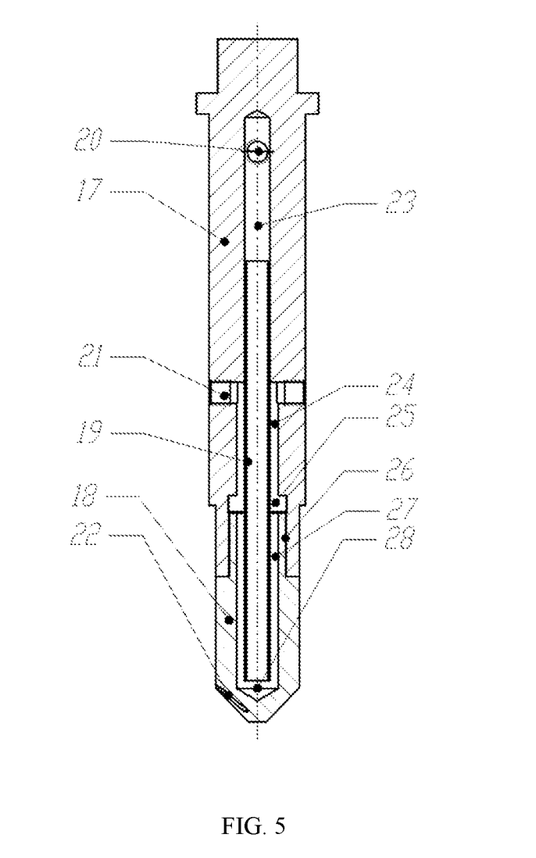
FIG. 5 is the cross section of the cooling pin.
Figure 6:
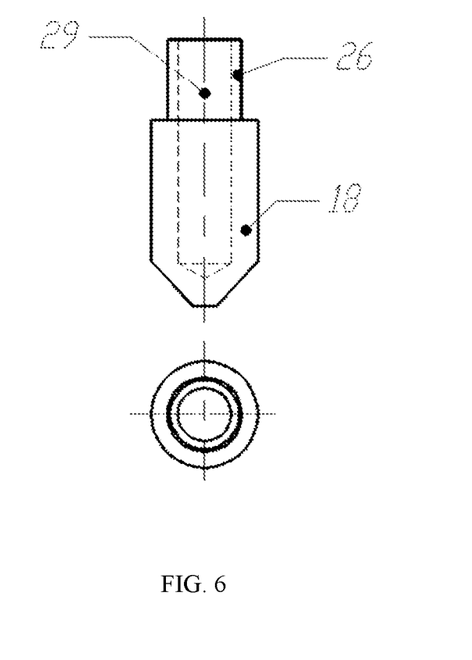
FIG. 6 is top and front view of the upper sample.

What FIG. 5 illustrates is that the cooling pin includes upper sample fixture 17, upper sample 18, copper tube 19, water inlet 20, water outlet 21, temperature measuring hole 22. FIG. 6 is the top and front view of the upper sample 18 in the present invention. The temperature measuring hole 22 for a thermocouple with a length of 10 mm and a diameter of 2 mm is arranged on the upper sample 18. The included angle between the axis of the temperature measuring hole 22 and the bottom surface of the upper sample 18 is 60°. The vertical distance between the bottom center of the temperature measuring hole 22 and the bottom surface of the upper sample 18 is 3 mm. The stepped hole is inside the upper sample fixture 17. The diameter of the stepped hole increases gradually from top to bottom, which is called small hole 23, middle hole 24, and threaded hole 25. The distance between the bottom surface of the small hole 23 and the upper surface of the upper sample fixture 17 is 20 mm. The length of the threaded hole 25 is 20 mm. The distance between the bottom surface of the middle hole 24 and the bottom surface of the threaded hole 25 is 30 mm. The straight hole 29 is arranged in the upper sample 18. The bottom surface of the straight hole 29 is 6 mm far from the bottom surface of the upper sample 18. The connecting head 26 of the upper sample 18 is provided with a thread whose length is 15 mm. The upper sample 18 is connected to the stepped hole of the upper sample fixture by thread hole 25. Waterproof tape can be used to prevent water leakage. The upper sample fixture 17 is matched with the upper sample 18 stepped hole for tightening and limiting. The copper tube 19 and the small hole 23 of the upper sample fixture 17 are connected by interference joint. The copper tube 19 should be fixed by spot welding, if necessary. The water inlet 20 is connected to the small hole 23 and is arranged on the outer wall of the upper sample fixture 17 at a distance of 10 mm from the bottom of the small hole 23. The water outlet 21 is connected with the middle hole 24 and is arranged on the outer wall of the upper sample fixture 17 at the bottom of the middle hole 24 of the upper sample fixture 17. There is a 2-3 mm radial gap between the inner wall of the straight hole 29 and the outer wall of the copper tube 19 in the upper sample 18. The height of the bottom gap 28 between the bottom surface of the copper tube 19 and the bottom surface of the straight hole 29 of the upper sample 18 is 4 mm. The interior of copper tube 19 is the inlet channel. The outlet channel consists of the bottom gap 28, the radial gap 27, the middle hole 24, and threaded hole 25 of the upper sample fixture 17. The water inlet 20, water inlet channel, water outlet channel, water outlet 21, and external cooling equipment form a circulating cooling system for cooling the bottom of the upper sample 18.

Figure 3:
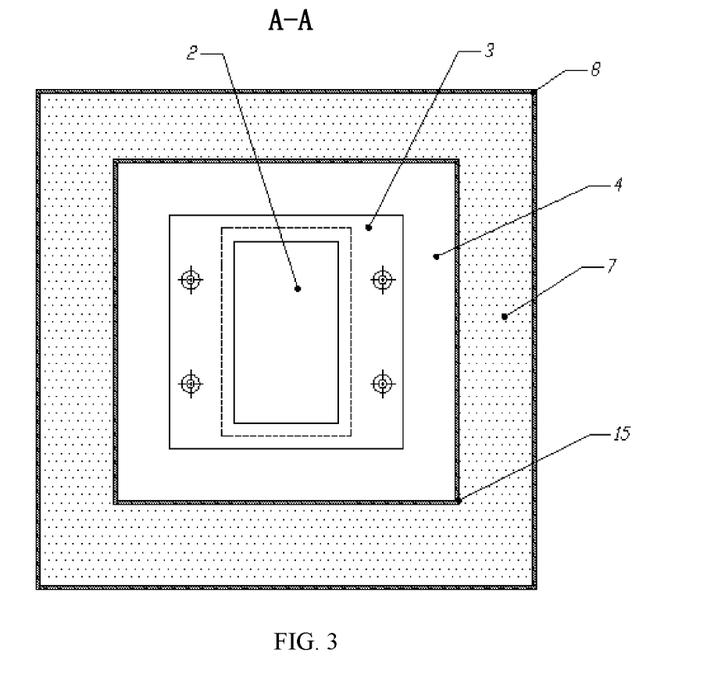
FIG. 3 is top view of the friction sample plate, briquetting, support shell and thermal insulation shell.
Figure 4:
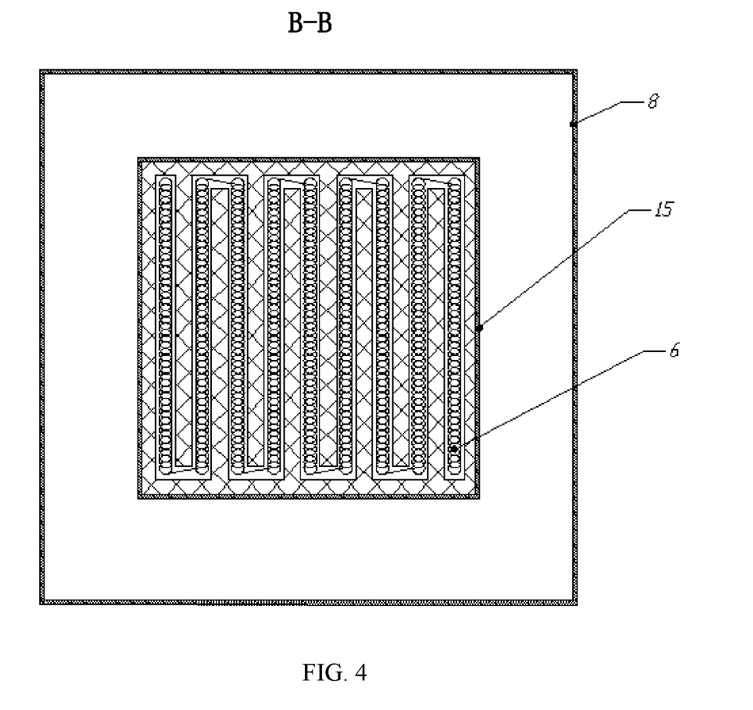
FIG. 4 is top view of electric resistance heating plate.

As shown in FIG. 3, it is an A-A sectional view of the high temperature heating chamber. The view is also the top view of the assembly of friction sample plate 2 and support block 3. The friction sample plate 2 is rectangular. The surface of the sample is perpendicular to the axis of the cooling pin. Under normal force, four sides of the friction sample plate can prevent warping during the test. FIG. 4 is a B-B sectional view of the high temperature heating chamber, that is, a top view of the electric resistance wire arrangement of the electric resistance heating plate 6. The internal temperature of the high temperature heating chamber can reach 900° C. The temperature of the friction sample plate 2 can reach 850° C. The temperature measuring groove 13 for the thermocouples is located on the lower surface of the support block 4. The length of the groove is 60 mm, and the width and height are both 2 mm. In addition to that, the space between support shell 15 and thermal insulation shell 8 and the gap of thermal insulation base 9 are filled with thermal insulation fiber 7. The fiber material is insulated and has the characteristics of heat preservation. The resistance wire is made of nichrome. The electric resistance wires are laid out horizontally to ensure rapid heating of the friction sample plate 2. The thermal insulation base 9 and cushion block 12 of the high temperature heating chamber are made of NiCr15Fe7TiAl to reduce internal heat conduction. Thermal insulation shell 8 and support shell 15 are made of 06Cr25Ni20 stainless steel to prevent internal heat dissipation. The material of support block 4 is 4Cr5MoSiV1. The material of ceramic plate 5 is zirconia ceramic which are insulative and high temperature resistant, ensuring the safe operation of the electric resistance wire and circuit to prevent electric shock.

The circulating cooling system decreases the effect of the high temperature heating chamber on the upper sample and can maintain the temperature of the upper sample at 200° C. The cooling path of the circulating cooling system is as follows: 1) The circulating cooling medium adjusts initial temperature through external cooling equipment; 2) The circulating cooling medium enters the internal channel of the upper sample fixture by the water inlet; 3) The circulating cooling medium arrives at the bottom gap of the upper sample through the water inlet channel; 4) The circulating cooling medium reach the water outlet through the radial gap of the upper sample and the water outlet channel in the upper sample fixture, and returns to the external cooling equipment.

The embodiment described above is only the concrete implementation of the present invention, illustrating the technical scheme of the present invention instead of a limit, and the protection scope of the present invention is not limited to this. Although the present invention has been described in detail with reference to a concrete example, those skilled in the technology should understand that numerous changes and modifications, as well as equivalent replacements of some technical features, can be made without departing from the scope and spirit of the present invention as described above. Therefore, the scope of protection of the present invention should be subject to the scope of protection of the claims.

What is claimed is:

1. A friction and wear test device for realizing pin-on-plate differential temperature distribution and self-adaptive adjustment, comprising a high temperature heating chamber and a cooling pin, wherein
    the high temperature heating chamber is fastened horizontally to a mobile base;
    an axis of the cooling pin is perpendicular to an upper surface of the mobile base;
    the cooling pin contacts a friction sample plate through a hole of an insulation cover located on a top of the high temperature heating chamber;
    an electric resistance heating plate is located in a bottom closed space under the friction sample plate in the high temperature heating chamber;
    an electric resistance heating is used to heat the friction sample plate to an experiment temperature;
    a circulating cooling channel is arranged inside the cooling pin;
    a cooling medium in the circulating cooling channel adjusts and cools a temperature of a sample;
    a first thermocouple and a second thermocouple, distributed separately in a temperature measuring groove of the high temperature heating chamber and a temperature measuring hole of the cooling pin, and are configured to measure the temperature in real time;
    wherein the high temperature heating chamber comprises the insulation cover, the friction sample plate, a briquetting, a support block, a ceramic plate, the electric resistance heating plate, a thermal insulation fiber, a support shell, a thermal insulation shell, a thermal insulation base, a cushion block, the temperature measuring groove, a base, and the mobile base; wherein
    electric resistance wires are disposed in the electric resistance heating plate;
    the friction sample plate is fixed in a square groove of the support block under a pressure of the briquetting which is connected with the support block by screws;
    the support block is connected to the support shell by screws;
    a lower surface of the support block is in contact with an upper surface of the ceramic plate;
    the ceramic plate is located on an upper surface of the electric resistance heating plate;
    an outer wall of the ceramic plate is in contact with an inner wall of the support shell;
    a bottom of the thermal insulation shell is connected to a side wall of the thermal insulation base by screws;
    the support shell is connected to the thermal insulation base by screws;
    the thermal insulation shell and the support shell are connected by bolts;
    the cushion block is located in a square groove of the thermal insulation base;
    the thermal insulation base is connected with the base by screws, and the base is connected with the mobile base by screws;
    the electric resistance heating plate is installed on a stepped surface of the thermal insulation base and an upper plane of the cushion block;
    the ceramic plate and the support block are provided with through-holes below the friction sample plate; and
    the electric resistance heating plate heats the friction sample plate by a heat radiation of the through-holes and a heat conduction of the ceramic plate and the support block.

2. The friction and wear test device as claimed in claim 1, wherein the cooling pin consists of an upper sample fixture, a copper tube, a water inlet, a water outlet, and the temperature measuring hole; wherein
    an upper sample is provided with the temperature measuring hole for placing the second thermocouple;
    a length of the temperature measuring hole is 10-12 mm and a diameter of the temperature measuring hole is 2 mm;
    an angle between an axis of the temperature measuring hole and a bottom surface of the upper sample is 60-70°;
    a vertical distance between a center of a bottom surface of the temperature measuring hole and the bottom surface of the upper sample is 3-4 mm;
    a stepped hole is inside the upper sample fixture;
    a diameter of the stepped hole increases gradually from top to bottom to form a small hole, a middle hole and a threaded hole;
    a distance between a bottom surface of the small hole and an upper surface of the upper sample fixture is 20-30 mm;
    a length of the threaded hole is 20-25 mm;
    a distance between a bottom surface of the middle hole and a bottom surface of the threaded hole is 30-40 mm;
    a straight hole is arranged in the upper sample;
    a bottom surface of the straight hole is 5-8 mm from the bottom surface of the upper sample;
    the upper sample is connected with the stepped hole of the upper sample fixture;
    the upper sample fixture is matched with an upper sample stepped hole for tightening and limiting position;
    the copper tube and the small hole of the upper sample fixture are connected;
    the copper tube is fixed by spot welding, if necessary;
    the water inlet is connected with the small hole and arranged on an outer wall of the upper sample fixture with a distance of 8-15 mm from a bottom of the small hole;
    the water outlet is connected with the middle hole and arranged on the outer wall of the upper sample fixture at a bottom of the middle hole of the upper sample fixture;
    a 2-3 mm radial gap is formed between an inner wall of the straight hole and an outer wall of the copper tube in the upper sample;
    a height of a bottom gap between a bottom surface of the copper tube and the bottom of the straight hole is 4-5 mm;
    an interior of the copper tube is a water inlet channel;

a water outlet channel consists of the bottom gap, the radial gap, the middle hole and threaded hole of the upper sample fixture; and the water inlet, the water inlet channel, the water outlet channel, the water outlet and an external cooling equipment form a circulating cooling system for cooling the bottom surface of the upper sample.

3. The friction and wear test device as claimed in claim 2, wherein the circulating cooling system decreases an effect of the high temperature heating chamber on the upper sample and maintains a temperature of the upper sample at 200° C., meanwhile a cooling path of the circulating cooling system operates as follows:

1) The circulating cooling medium adjusts an initial temperature via the external cooling equipment;
2) The circulating cooling medium enters an internal channel of the upper sample fixture via the water inlet;
3) The circulating cooling medium arrives at the bottom gap of the upper sample via the water inlet channel; and
4) The circulating cooling medium reaches the water outlet via the upper sample's radial gap and the water outflow channel in the stepped hole of the upper sample fixture, and returns to the external cooling equipment.

4. The friction and wear test device as claimed in claim 1, wherein the friction sample plate is rectangular panel;

a surface of the sample is perpendicular to the axis of the cooling pin; and four sides of the friction sample plate under a normal force of the briquetting can prevent warping and reduce errors caused by a deformation of friction sample during the test.

5. The friction and wear test device as claimed in claim 1, wherein an inner temperature of the high temperature heating chamber can reach 900° C. and a temperature of the friction sample plate can reach 850° C.;

the temperature measuring groove for placing the first thermocouple is arranged on the lower surface of the support block;

a length of the temperature measuring groove is 60-70 mm, and a width and a height of the temperature measuring groove are both 2 mm;

a space between the support shell and the thermal insulation shell and a gap of the thermal insulation base are filled with thermal insulation fiber;

the electric resistance wires lay out horizontally making sure rapid heating of the friction sample plate;

the support shell, the thermal insulation shell, the thermal insulation base and the cushion block are made of thermal insulation and high temperature resistant metal which can prevent a loss of the internal heat;

the support block is made of heat conductive and high temperature resistant metal; and the ceramic plate is made of insulating and high temperature resistant ceramic material which can ensure the safe operation of the electric resistance wire and circuit to prevent electric shock.

\* \* \* \* \*